United States Patent [19]

Grieshop

[11] Patent Number: 5,340,265
[45] Date of Patent: * Aug. 23, 1994

[54] GRAIN WAGON WITH UNLOAD MECHANISM

[75] Inventor: Maurice Grieshop, Ft. Recovery, Ohio

[73] Assignee: J. & M. Manufacturing Co., Inc., Ft. Recovery, Ohio

[ * ] Notice: The portion of the term of this patent subsequent to May 7, 2008 has been disclaimed.

[21] Appl. No.: 859,125

[22] Filed: Mar. 27, 1992

Related U.S. Application Data

[63] Continuation of Ser. No. 678,203, Apr. 1, 1991, Pat. No. 5,100,281, which is a continuation of Ser. No. 385,440, Jul. 26, 1989, Pat. No. 5,013,208.

[51] Int. Cl.$^5$ .............................. B60P 1/40
[52] U.S. Cl. ........................ 414/526; 414/519; 414/523
[58] Field of Search ............. 414/326, 503, 505, 519, 414/520, 523, 526; 198/550.1, 668

[56] References Cited

U.S. PATENT DOCUMENTS

| | | |
|---|---|---|
| D. 306,864 | 3/1990 | Van Mill . |
| 2,296,014 | 9/1942 | Benzel, Sr. et al. . |
| 2,772,767 | 12/1956 | Seifert . |
| 3,265,253 | 8/1966 | Niewold . |
| 3,337,068 | 8/1967 | Meharry . |
| 3,477,599 | 11/1969 | De Coene . |
| 3,561,681 | 2/1971 | Tyler . |
| 3,575,306 | 4/1971 | Obermeyer . |
| 4,092,004 | 5/1978 | Leverenz . |
| 4,095,705 | 6/1978 | Hood . |
| 4,274,790 | 6/1981 | Barker . |
| 4,415,303 | 11/1983 | Westendorf . |
| 4,427,105 | 1/1984 | Hawley . |
| 4,662,812 | 5/1987 | Busboom et al. . |
| 4,669,945 | 6/1987 | Pollard et al. . |
| 4,846,621 | 7/1989 | Warsaw . |
| 4,923,358 | 5/1990 | Van Mill . |
| 5,013,208 | 5/1991 | Grieshop . |

FOREIGN PATENT DOCUMENTS 2141520 2/1973 Fed. Rep. of Germany .
1167113 10/1969 United Kingdom .

OTHER PUBLICATIONS

AugerWagons, Kinze Manufacturing, Inc., (AW-987).
Grain Buggy 150/250, Parker Industries, No. 86-9866.
Brent Grain Carts, New Product Information, Unverferth Manufacturing Co., Inc., No. 68-1796.
People are Created Equal, Grain Carts are Not! Straight Talk, Parham Industries, Inc.
Grain Carts, Wagon Gear, Implement Carriers, John Deere, A-14-86-02.
M & W, Model 4800 A Little Red Wagon Grain Cart, M & W Gear, 4284.

(List continued on next page.)

*Primary Examiner*—Frank E. Werner
*Attorney, Agent, or Firm*—Jacox & Meckstroth

[57] ABSTRACT

A wagon for transporting grain and other particulate matter. The wagon is adapted to be attached to a tow vehicle. The wagon has a container which is provided with a forward wall. Within the container is a conduit. The conduit has a part which protrudes outwardly from the container and forwardly from the forward wall. Within the conduit is an auger. Pivotally attached to the part of the conduit which extends outwardly from the forward wall is a conduit extension member. The conduit extension member is pivotally movable to a position extending from the forward wall. Within the conduit extension member is an auger extension member. The auger extension member is operatively connected to the auger when the conduit extension member extends from the forward wall. Thus, a condition is established for discharging grain from the container of the wagon. The conduit extension member is pivotally movable to a position closely adjacent the forward wall. Thus, a condition is established for movement of the wagon upon a highway. The conduit extension member is thus always positioned for observation by the operator of the tow vehicle.

6 Claims, 2 Drawing Sheets

OTHER PUBLICATIONS

Large Capacity Grain Carts, Brent Industries, Inc.
Hauler–Tender/Utility Boxes, United Farm Tools, Inc.
The Profit Line Carts, Brent Industries, Inc., PGA10M585.
Heavy duty grain carts, New Product Information, Unverferth Manufacturing, Co., Inc., Form No. 116–9789.
4500 Grain Buggy, Parker Industries, No. 4500-5-3-6313.
Grain Carts, Bradford Industries, Inc., printed Jul. 1986.
Grain Cart, Model 475, Kill Brothers Co., 80185.
528 Grain Cart, Bradford Industries, Inc., printed Aug. 1983.
Grain Cart Model 1200, Kill Brothers Co., Form 52182.
Brent Grain Carts, Unverferth Manufacturing Co., Inc., No. 19–1794.
Cost–cutting Grain Carts, Model 456, Parham Industries, Inc., GC456–87.
Grainshuttle, The quality-built single auger graint cart, Orthman Manufacturing, Inc., BAC 8328/5/86.
House Manufacturing Company, P.O. Box 577, Hickory Ridge, Ark. 72347, Rotational Grain Cart Model DR250 Produced and Sold 1976–1979.
Photographs of Rotational Grain Cart sold by House Manufacturing Company, 1976–1979.
Now Auger Unload Giant 6600, Parker Industries, Inc., 1977.
Hinson 812 Unloading Grain Cart, Royal Industries, Cat. No. 812–676C.

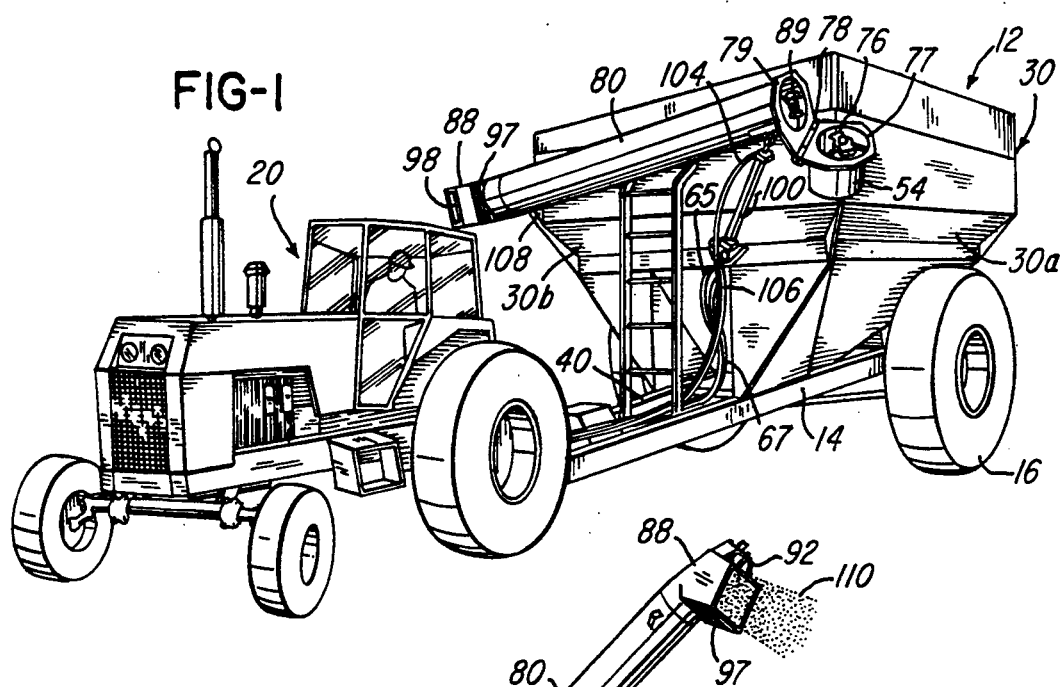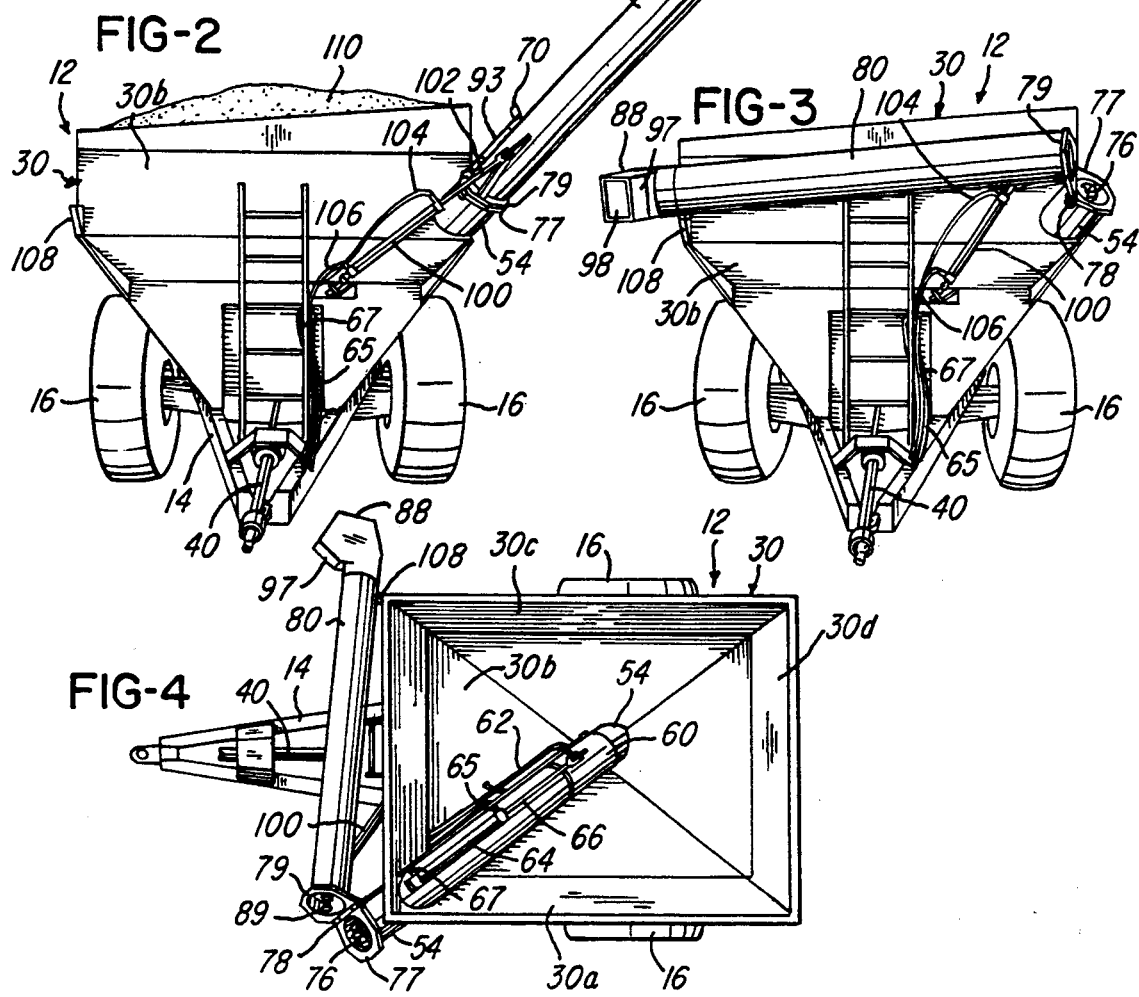

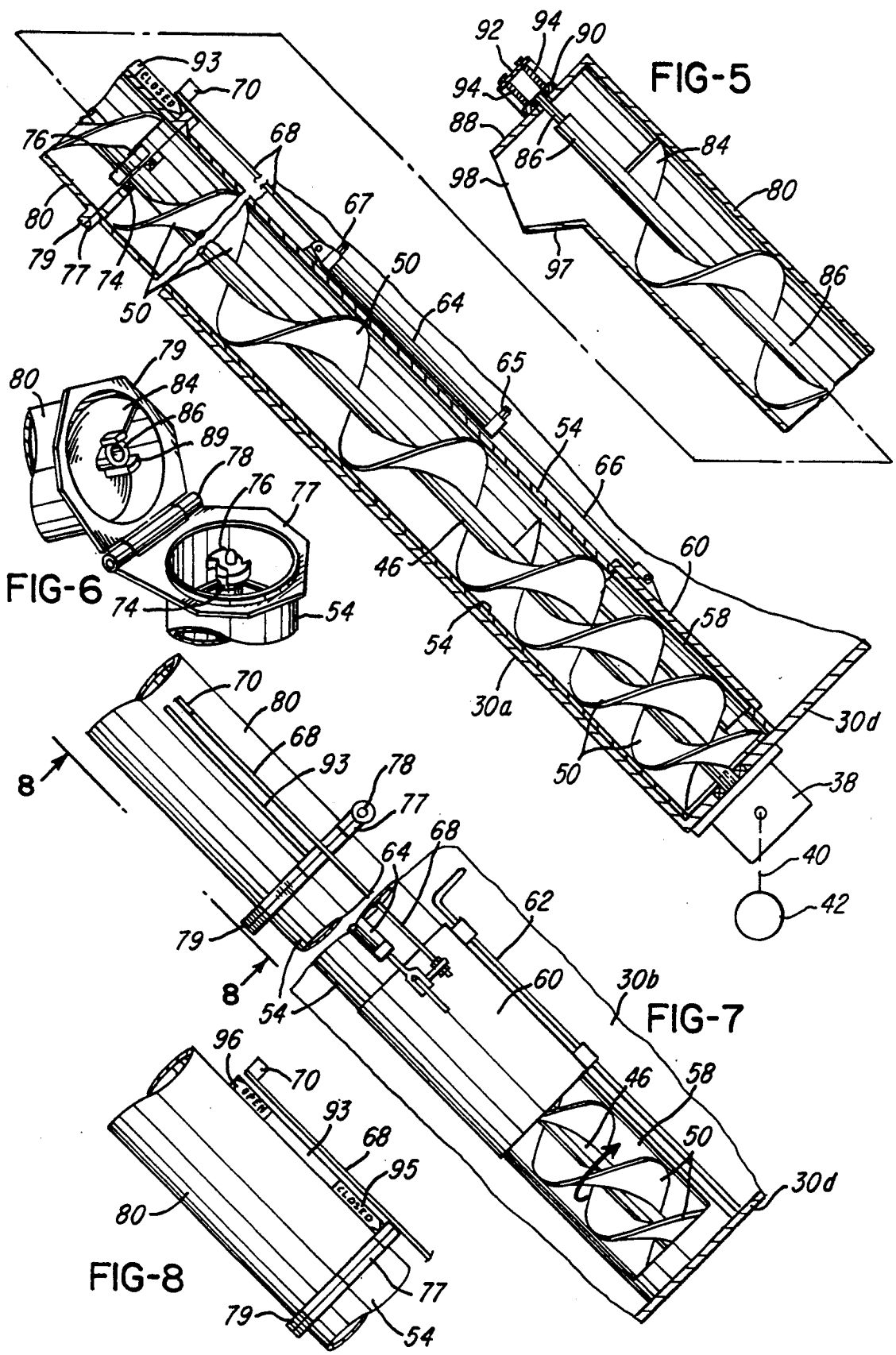

GRAIN WAGON WITH UNLOAD MECHANISM

RELATED APPLICATIONS

This application is a continuation of patent application Ser. No. 07/678,203, filed Apr. 1, 1991, now U.S. Pat. No. 5,100,281, which is a continuation of patent application Ser. No. 07/385,440, filed Jul. 26, 1989 now U.S. Pat. No. 5,013,208.

BACKGROUND OF THE INVENTION

A grain wagon is adapted to contain grain or other particulate matter. The wagon is adapted to be attached to a tow vehicle. The wagon comprises a container. In order to readily remove the contents of the container, an auger type of mechanism is employed within the container. The auger mechanism includes a conduit. The conduit, with the auger, extends from the container so that the contents of the container can be discharged to a position spaced from the wagon. The conduit cannot extend from the wagon during travel of the wagon along a highway or road. Therefore, the conduit must have an extension portion which is movable to a position adjacent the wagon. The conduit extension portion also has an auger member therein. Auger operation and movement of the conduit extension are powered by means having an energy source in the tow vehicle. The energy source is controlled by the operator of the tow vehicle.

In the past, grain wagons have been provided with conduit extension portions which are pivotally movable between a position extended from the container portion of the wagon and which are also movable to a position adjacent the container portion of the wagon.

It is desirable that the operator of the tow vehicle be able to observe the conduit extension and in all positions of the conduit extension member. In the past, grain wagons have been provided with conduit extension members which have not been readily observable by the operator of the tow vehicle in all positions of the conduit extension member.

Grain wagons have been constructed in which a conduit extension is positioned at the forward portion of the wagon, and is readily observable by the operator off the tow vehicle. However, such grain wagons have had two augers. A first auger feeds the second auger. Such structure is costly to produce and involves additional service problems.

It is therefore an object of this invention to provide a grain wagon which has unload means which includes a single auger unit and which has a movable conduit extension member which is observable by the operator of the tow vehicle in all positions of the conduit extension member.

It is another object of this invention to provide such a grain wagon which can be constructed at relatively low costs.

Other objects and advantages of this invention reside in the construction of parts, the combination thereof, the method of production and the mode of operation, as will become more apparent from the following description.

SUMMARY OF THE INVENTION

This invention comprises a grain wagon which includes means for unloading the grain from the wagon. The wagon includes a container having internal walls which slope downwardly and inwardly and which direct the grain toward the bottom of the container. An auger has a lower portion at the bottom of the container. The auger extends upwardly within the container. The auger is enclosed by a conduit. The upper part of the conduit and auger therewithin protrudes from a front wall of the container.

A conduit extension member is pivotally attached to the protruding portion of the conduit and is movable to a position extending from the container. The conduit extension member is also movable to a position along the front wall of the container. Within the conduit extension member is an auger extension member.

When the conduit extension member extends from the container, the auger extension member is operably connected to the auger, for rotation of the auger extension member with rotation of the auger. Thus, conditions are established for discharging grain from the container. When the conduit extension member is adjacent the front wall of the container, conditions are established for movement of the wagon upon a highway or the like without interference with other vehicles upon the highway.

Motor means are provided for pivotal movement of the conduit extension member. The motor means are operated by an energy source carried by the tow vehicle. The energy source is controlled by the operator of the tow vehicle. An energy source carried by the tow vehicle also operates the auger and is controlled by the operator of the tow vehicle. The auger is operated for unloading of grain from the container.

Due to the fact that the conduit extension member is positioned at the front part of the grain wagon in all positions thereof, the conduit extension member is clearly observable by the operator of the tow vehicle in all positions of the conduit extension member. Thus, maximum efficiency and safety in movement of the conduit extension member and in unload operation and in wagon travel are possible.

BRIEF DESCRIPTION OF THE VIEWS OF THE DRAWINGS

FIG. 1 is a front perspective view showing a grain wagon of this invention and a tow vehicle attached thereto. This view shows the conduit extension member of the wagon in a rest position.

FIG. 2 is a front view of the grain wagon of FIG. 1, showing the conduit extension member in an operational position.

FIG. 3 is a front view of the grain wagon of FIGS. 1 & 2, showing the conduit extension member in a rest position.

FIG. 4 is a top view of the grain wagon of FIGS. 1, 2, and 3, drawn on a smaller scale than FIGS. 1, 2, and 3, showing a conduit within the container of the wagon and showing the conduit extension member in a rest position at the front part of the container.

FIG. 5 is a side sectional view, with parts broken away, drawn on a larger scale then FIGS. 1-4, showing the auger and the conduit within the container and showing the conduit extension member and the auger extension member. In this view the cover member of the conduit is shown in a closed position.

FIG. 6 is a fragmentary perspective view, drawn on a smaller scale than FIG. 5, showing a portion of the auger and conduit and a portion of the conduit extension member and auger extension member. This view also shows the means for operably joining the auger extension member to the auger.

FIG. 7 is a fragmentary top sectional view, drawn on substantially the same scale as FIG. 5, with parts broken away and shown in section, showing the auger and conduit and the conduit extension member. This view shows the cover member of the conduit in an open position.

FIG. 8 is a fragmentary view, taken substantially on line 8—8 of FIG. 7, illustrating the indicator means which indicate the position of the cover member of the conduit.

DETAILED DESCRIPTION OF THE PREFERRED EMBODIMENT

FIG. 1 shows a grain wagon 12 of this invention. The grain wagon 12 has a support frame 14 which is attachable to a tow vehicle 20. The grain wagon 12 has wheels 16 which support the support frame 14. The support frame 14 supports a body or container 30 which has side walls 30a and 30c, and a front wall 30b and a back wall 30d. All of the walls 30a, 30b, 30c, and 30d slope downwardly and inwardly and terminate at the lowermost part of the container 30.

Shown in FIG. 5, below the side wall 30a and below the back wall 30d is a gear box 38. Operably attached to the gear box 38 is a power take-off shaft 40, shown diagrammatically in FIG. 5. The power take-off shaft 40 extends from a power source 42 which is carried by the tow vehicle 20. The power take-off shaft 40 is also shown in FIGS. 2, 3, and 4.

Shown in FIG. 5 extending from the gear box 38 and extending through the back wall 30d is a drive shaft 46 which carries an auger 50. The auger 50 is within a conduit 54 which rests upon the side wall 30a and the front wall 30b. The conduit 54 extends upwardly from the lowermost part of the container 30. The lower part of the conduit 54 engages the back wall 30d. The lower part of the conduit 54 and the lower part of the auger 50 are thus adjacent the walls 30a, 30b, 30c, and 30d, at the lowermost part of the container 30.

The lower part of the conduit 54 has an opening 58 therein. Covering the opening 58 is a cover member 60 which is axially movable along the conduit 54. The cover member 60 is supported by a bar 62 which is attached to the wall 30d and extends along the lower part of the conduit 54. The cover member 60 is movable to close and to open the opening 58.

An elongate fluid motor 64 is attached to the conduit 54 and has an actuator rod 66 which is attached to the cover member 60. The fluid motor 64 has fluid conductors 65 and 67 attached thereto for flow of fluid into and out of the fluid motor 64 for operation of the fluid motor 64. Also attached to the cover member 60 is an actuator rod 68 which extends upwardly from the cover member 60 and along the conduit 54. The actuator rod 68 has an indicator flag 70 attached thereto.

The upper end of the shaft 46 is supported by a bearing member 74 which is carried by the conduit 54, as shown in FIG. 5. The bearing member 74 is adjacent the upper portion of the conduit 54. At the upper end of the shaft 46 and rotatable therewith is a connector member 76.

As shown in FIGS. 1-4, the upper portion of the conduit 54 protrudes outwardly from the container 30 from a position between the front wall 30b and the side wall 30a, but primarily from the front wall 30b. The protruding part of the conduit 54 has a flange 77, which is at the upper end of the conduit 54.

A hinge device 78 is attached to the flange 77 at the upper part of the conduit 54. The flange device 78 is also attached to a flange 79 which is attached to a conduit extension member 80. The conduit extension member 80 extends from the conduit 54. Within the conduit extension member 80 is an auger extension member 84 which is supported by an auger extension shaft 86. A connector member 89, best shown in FIG. 6, is attached to the auger extension shaft 86, adjacent the flange 79 and is adapted to operably mesh with the connector member 76 which is attached to the shaft 46 of the auger 54.

The conduit extension member 80 has an end portion 88, shown in FIG. 5, which encloses the outer end of the conduit extension member 80. The auger extension shaft 86 is rotatably supported within the end portion 88 of the conduit extension member 80. The auger extension shaft 86 extends through the end portion 88. Attached to the shaft 86 external of the end portion 88 and rotatable with the shaft 86 is an engagement plate 90. A bracket 92 is attached to the end portion 88 and has attached thereto a plurality of spring members 94. The auger extension shaft 86 and the auger extension member 84 are axially movable within the conduit extension member 80. The spring member, s 94 apply pressure upon the plate 90 and urge the auger extension shaft 86 and the auger extension member 84 toward the flange 79 of the conduit extension member 80.

Attached to the conduit extension member 80 adjacent the flange 79 is a support strip 93 which has indicator elements 95 and 96 attached thereto, as best shown in FIG. 8. The indicator element 95 is labeled "closed", and the indicator element 96 is labeled "open".

The end portion 88 of the conduit extension member 80 and a portion 97 thereof form a spout 98 at the end portion 88 of the conduit extension member 80.

Pivotally mounted upon the exterior surface of the front wall 30b of the container 30 is a fluid motor 100. The fluid motor 100 has an actuator rod 102 which is pivotally attached to the conduit extension member 80. The fluid motor 100 has fluid conductors 104 and 106 connected thereto for flow of fluid into and out of the fluid motor 100 for operation of the fluid motor 100.

The fluid conductors 104 and 106, which are connected to the fluid motor 100, and the fluid conductors 65 and 67, which are connected to the fluid motor 64 within the container 30, are joined to a fluid pump, not shown, which is carried by the tow vehicle 20.

FIGS. 1, 3, and 4 show the conduit extension member 80 positioned in a rest position at the forward part of the body 30 and closely adjacent the front wall 30b. In this position the outer part of the conduit extension member 80 rests upon a bracket 108 which is attached to the front wall 30b. In this position the conduit extension member 80 the grain wagon 12 is in condition for movement along a highway or road.

When it is desired to discharge grain from the grain wagon 12 the fluid motor 100 is operated by fluid flow through the fluid conductors 104 and 106. The actuator rod 102 is extended from the fluid motor 100 and the conduit extension member 80 is forced to pivotally move from the position thereof shown in FIGS. 1, 3, 4 to the position thereof shown in FIG. 2. When the conduit extension member 80 is positioned as shown in FIG. 2, the conduit extension member 80 extends angularly forwardly from the upper front portion of the container 30.

When the auger member 50 is inactive within the container 30, the cover member 60 covers the opening 58 in the conduit 54. Thus, grain 110 within the container 30 cannot engage the auger 50. When it is desired to discharge grain 110 from the container 30, the conduit extension member 80 is positioned as shown in FIG. 2. As stated above, the fluid motor 100 moves the conduit extension member 80. When the cover member 60 covers the opening 58 in the conduit 54, the flag 70 which is attached to the rod 68 is positioned adjacent the indicator element 95, which is labeled "closed". This is clearly visible to the operator of the tow vehicle 20.

To operate the auger 50, the power take-off shaft 40 is rotated by control of the operator of the tow vehicle 20. Rotation of the power take-off shaft 40 rotates the shaft 46, through the gear box 38. Due to the fact that the conduit extension member 80 is in alignment with the conduit 54, the auger extension member 84 is in alignment with the auger 50. However, the auger extension member 84 may not be operably connected to the auger 50. The spring members 94, at the end portion 88 of the conduit extension member 80, urge the auger extension shaft 86 and the connector member 89, which is attached thereto, toward the shaft 46 of the auger 50. As the shaft 46 rotates, the connector member 76 at the end portion of the shaft 46 comes into alignment with the connector member 89 of the shaft extension member 86. As this occurs, the connector member 76 of the shaft 46 meshes with the connector member 89 of the shaft extension member 86. Thus, the shaft extension member 86 becomes operably coupled to the shaft 46, and the auger extension member 84 rotates with rotation of the shaft 46 and the auger 50.

After this rotative movement of the shafts 46 and 86 has commenced, the fluid motor 64 is operated through the fluid conductors 65 and 67, and the actuator rod 66 moves the cover member 60 upwardly along the conduit 54. Thus, the cover member 60 is moved from the opening 58. When the fluid motor 64 moves the cover member 60 to an open position, the rod 68 is moved, and the indicator flag 70 is moved from a position adjacent the indicator element 95, "closed", to a position adjacent the indicator element 96, which is labeled "open". This is clearly observable by the operator of the tow vehicle 20.

When the cover member 60 is moved from the opening 58, grain 110 falls downwardly into the conduit 54 and is moved upwardly by rotation of the auger 50 within the conduit 54. The grain 110 moves from the auger 50 to the auger extension member 84, within the conduit extension member 80. The grain 110 is moved by the auger extension member 84 to the spout 98 and is discharged therefrom, as illustrated in FIG. 2. Due to the fact that the conduit extension member 80 is angled forwardly from the container 30, the operator of the tow vehicle 20 can readily observe the discharge of grain 110 from the conduit extension member 80.

As shown and discussed, the conduit extension member 80 is positioned at the front part of the container 30. Therefore, when the conduit extension member 80 is in the rest position thereof as shown in FIGS. 1, 3, and 4, the operator of the tow vehicle 20 can readily observe the conduit extension member 80. Furthermore, when the conduit extension member 80 is pivotally moved from the position thereof shown in FIGS. 1, 3, and 4 to the position thereof shown in FIG. 2, the operator of the tow vehicle 20 can readily observe the entire movement of the conduit extension member 80.

Thus, it is understood that a single auger unit comprising an auger 50 and an auger extension member 84, and a single conduit unit comprising a conduit 54 and a conduit extension member 80 are employed in this invention. The conduit extension member 80 is positioned so that an operator of the tow vehicle 20 can readily observe the conduit extension member 80 at all times and can observe the flow of grain 110 from the conduit extension member 80.

Although the preferred embodiment of a grain wagon of this invention has been described, it will be understood that within the purview of this invention various changes may be made in the form, details, proportion and arrangement of parts, the combination thereof, and the mode of operation, which generally stated consist in a structure within the scope of the appended claims.

The invention having thus been described, the following is claimed:

1. A grain wagon adapted to be pulled by a tow vehicle, said grain wagon comprising a wheel supported frame including means for connecting said frame to the tow vehicle, a container supported by said frame and including front and rear walls connected by left and right side walls to define a chamber having a generally rectangular configuration in horizontal cross section, said front and rear walls and said side walls including converging and sloping lower portions to provide said chamber with a lower grain collecting portion, an elongated auger unit including a lower base portion and an upper extension portion, power operated means for rotating said auger unit, said base portion of said auger unit extending upwardly and forwardly and laterally on an incline from said collecting portion adjacent a left front corner portion of said container where said front wall connects with said left side wall, pivot means adjacent said left front corner portion and pivotally connecting said extension portion of said auger unit to said base portion, said pivot means supporting said extension portion of said auger unit for tilting movement between a grain position and a retracted stow position, said extension portion in said grain discharge position projecting upwardly and substantially forwardly from said container and laterally outwardly from said left side wall of said container to form an inclined continuation of said base portion, said extension portion in said retracted stow position projecting laterally and generally horizontally toward said right side wall and adjacent said front wall of said container, power operated means for moving said extension portion of said auger unit between said discharge and stow positions, and said pivot means providing for observing from the tow vehicle the entire said extension portion throughout movement between said discharge and stow positions.

2. A grain wagon adapted to be pulled by a tow vehicle, said grain wagon comprising a wheel supported frame including means for connecting said frame to the tow vehicle, a container supported by said frame and including front and rear walls connected by left and right side walls to define a chamber having a generally rectangular configuration in horizontal cross section, said container having a left front corner portion and a right front corner portion, said walls including converging and sloping lower portions to provide said chamber with a lower grain collecting region, an elongated auger unit including a lower base portion and an upper extension portion, power operated means for rotating said auger unit, said base portion of said auger unit extending upwardly and laterally and forwardly on an incline from said collecting region and projecting outwardly adjacent said left front corner portion of said container, a pivot connection adjacent said front left corner portion and pivotally connecting said extension portion of said auger unit to said base portion, said pivot connection supporting said extension portion of said auger unit for tilting movement between a grain discharge position and a retracted stow position, said extension portion in said grain discharge position projecting upwardly and substantially forwardly of said front wall of said container and laterally outwardly of said left side wall of said container to form an inclined and substantially aligned continuation of said base portion, said extension portion in said retracted stow position projecting laterally and generally horizontally from said pivot connection toward said right front corner portion and adjacent said front wall of said container, said pivot connection providing for pivoting said extension portion from said discharge position downwardly and rearwardly and laterally toward said right front corner portion to said retracted stow position, power operated means for moving said extension portion of said auger unit between said discharge and stow positions, and said pivot connection providing for observing from the tow vehicle the entire said extension portion throughout movement between said discharge and stow positions.

3. A grain wagon adapted to be pulled by a tow vehicle, said grain wagon comprising a wheel supported frame including means for connecting said frame to the tow vehicle, a container supported by said frame and including front and rear walls connecting by left and right side walls to define a chamber having a generally rectangular configuration in horizontal cross section, said container having a left front corner portion and a right front corner portion and a grain collecting portion, an elongated auger unit including a lower base portion and an upper extension portion, power operated means for rotating said auger unit, said base portion of said auger unit extending upwardly and laterally and forwardly within said chamber adjacent said left front corner portion and on an incline from said collecting portion, said base portion projecting outwardly from said chamber adjacent said left front corner portion of said container, a pivot connection adjacent said front left corner portion and pivotally connecting said extension portion of said auger unit to said base portion, said pivot connection supporting said extension portion of said auger unit for tilting movement between a grain discharge position and a retracted stow position, substantially the entire said extension portion in said grain discharge position projecting upwardly and substantially forwardly of the plane of said front wall of said container and laterally outwardly of the plane of said left side wall of said container to form an inclined and substantially aligned continuation of said base portion, said extension portion in said retracted stow position projecting laterally and generally horizontally from said pivot connection toward said right front corner and substantially parallel and adjacent said front wall of said container, said pivot connection providing for pivoting said extension portion from said discharge position downwardly and rearwardly and laterally toward said right front corner portion to said retracted stow position, power operated means for moving said extension portion of said auger unit between said discharge and stow positions, and said pivot connection providing for observing from the tow vehicle the entire extension portion throughout movement between said discharge and stow positions.

4. A grain a wagon adapted to be pulled by a tow vehicle, said grain wagon comprising a wheel supported frame including means for connecting said frame to the tow vehicle, a container supported by said frame and including front and rear walls connected by left and right side walls to define a chamber having a generally rectangular configuration in horizontal cross section, said container having a left front corner portion and a right front corner portion, said walls including converging and sloping lower portions, a lower grain collecting portion adjacent said converging and sloping lower portions, an elongated auger unit including a lower base portion and an upper extension portion, power operated means for rotating said auger unit, said base portion of said auger unit extending upwardly and laterally and forwardly within said chamber adjacent said sloping portions and on an incline from said collecting portion, said base portion projecting through said walls adjacent said front left corner portion of said container, a pivot connection adjacent said front left corner portion and pivotally connecting said extension portion of said auger unit to said base portion, said pivot connection supporting said extension portion of said auger unit for tilting movement between a grain discharge position and a retracted stow position, said extension portion in said grain discharge position projecting upwardly and substantially forwardly of the plane of said front wall of said container and laterally outwardly of the plane of said left side wall of said container to form an inclined continuation of said base portion, said extension portion in said retracted stow position projecting laterally from said pivot connection toward said right front corner portion and substantially parallel and adjacent said front wall of said container exterior of said chamber, said pivot connection providing for pivoting said extension portion from said discharge position downwardly and rearwardly and laterally toward said right front corner portion to said retracted stow position, power operated means for moving said extension portion of said auger unit between said discharge and stow positions, and said pivot connection providing for observing from the tow vehicle said upper extension portion throughout movement between said discharge and stow positions.

5. A grain wagon adapted to be pulled by a tow vehicle, said grain wagon comprising a wheel supported frame including means for connecting said frame to the tow vehicle, a container supported by said frame and including front and rear walls connected by left and right side walls to define a chamber having a generally rectangular configuration in horizontal cross section, said container having a left front corner portion and a right corner portion, said walls including converging and sloping lower portions, a lower grain collecting portion adjacent said converging and sloping lower portions, an elongated auger unit including a lower base portion and an upper extension portion, power operated means for rotating said auger unit, said base portion of said auger unit extending upwardly and forwardly and laterally on an incline from said collecting portion and projecting outwardly adjacent said left front corner portion of said container, a pivot connection adjacent said left front corner portion and pivotally connecting said extension portion of said auger unit to said base portion, said pivot connection supporting said extension portion of said auger unit for tilting movement between a grain discharge position and a retracted stow position, substantially the entire said extension portion in said grain discharge position projecting upwardly and substantially forwardly of the plane of said front wall of said container and laterally outwardly of the plane of said left side wall of said container to form an inclining continuation of said base portion, said extension portion in said retracted stow position projecting laterally from said pivot connection toward said right front corner portion and adjacent and substantially parallel to said front wall of said container exterior of said chamber, said pivot connection providing for pivoting said extension portion from said discharge position downwardly and rearwardly and laterally toward said right front corner portion to sad retracted stow position, power operated means for moving said extension portion of said auger unit between said discharge and stow positions, said power operated means including a fluid actuated cylinder extending forwardly, upwardly and laterally to said extension position of said auger unit in said grain discharge position, and said pivot connection providing for observing from the tow vehicle said upper extension portion of said auger unit throughout movement between said discharge and stow positions.

6. A grain wagon as defined in claim 5 wherein said fluid actuated cylinder extends from said front wall.

* * * * *

UNITED STATES PATENT AND TRADEMARK OFFICE
CERTIFICATE OF CORRECTION

PATENT NO. : 5,340,265
DATED : August 23, 1994
INVENTOR(S) : Maurice Grieshop

It is certified that error appears in the above-identified patent and that said Letters Patent is hereby corrected as shown below:

Column 1, line 44, delete "off" and insert --of--.

Column 4, line 27, delete "member", second occurrence, and insert --members--; same line, delete "s".

Column 5, line 13, delete "clement" and insert --element--.

Claim 1, column 6, line 44, after "grain" insert --discharge--.

Claim 5, column 9, line 8, delete "inclining" and insert --inclined--; claim 5, column 10, line 2, delete "sad" and insert --said--.

Signed and Sealed this

Twenty-second Day of November, 1994

Attest:

BRUCE LEHMAN

Attesting Officer    Commissioner of Patents and Trademarks